United States Patent [19]

Childress

[11] Patent Number: 4,649,567
[45] Date of Patent: Mar. 10, 1987

[54] DISPATCH OVERDIALING FOR INTER-GROUP AND OTHER ADDED CALLING/CALLED ACCESS TO COMMUNICATIONS CHANNELS IN A TRUNKED RADIO COMMUNICATIONS SYSTEM

[75] Inventor: Jeffrey S. Childress, Lynchburg, Va.

[73] Assignee: General Electric Company, Lynchburg, Va.

[21] Appl. No.: 725,682

[22] Filed: Apr. 22, 1985

[51] Int. Cl.$^4$ .......................... H04Q 7/00; H04Q 9/00
[52] U.S. Cl. ...................................... 455/17; 455/33; 455/34; 455/54; 455/56; 379/63
[58] Field of Search ....................... 455/17, 32, 33, 34, 455/35, 53, 54, 56; 370/24, 32, 95; 179/2 EB

[56] References Cited

U.S. PATENT DOCUMENTS

| | | | |
|---|---|---|---|
| 2,533,662 | 12/1950 | Bartelink | 455/32 |
| 3,173,996 | 3/1965 | Rypinski, Jr. | 455/32 |
| 3,376,509 | 4/1968 | Willcox et al. | 455/55 |
| 3,387,212 | 6/1968 | Kaufman | 455/18 |
| 3,426,279 | 2/1969 | Berman | 455/32 |
| 3,535,636 | 10/1970 | Muilwijk | 455/34 |
| 3,539,924 | 9/1970 | Daskalakis et al. | 455/54 |
| 3,555,424 | 1/1971 | Malm | 455/38 |
| 3,582,787 | 6/1971 | Muller et al. | 455/33 |
| 3,634,627 | 1/1972 | Valentini | 455/34 |
| 3,663,762 | 5/1972 | Joel, Jr. | 455/33 |
| 3,707,679 | 12/1972 | Bruley et al. | 455/16 |
| 3,716,790 | 2/1973 | Romoser | 455/38 |
| 3,764,915 | 10/1973 | Cox et al. | 455/34 |
| 3,808,537 | 4/1974 | Sarati et al. | 455/54 |
| 3,898,390 | 8/1975 | Wells et al. | 455/33 |
| 3,913,017 | 10/1975 | Imaseki | 455/54 |
| 4,009,442 | 2/1977 | Von Bromssen | 455/164 |
| 4,013,958 | 3/1977 | Spayth | 455/32 |
| 4,112,257 | 9/1978 | Frost | 179/2 EB |

List continued on next page.

FOREIGN PATENT DOCUMENTS

| | | |
|---|---|---|
| 2030347 | 9/1978 | Italy . |
| 850698 | 10/1960 | United Kingdom . |
| 1145899 | 3/1969 | United Kingdom . |
| 1175130 | 12/1969 | United Kingdom . |
| 1185789 | 3/1970 | United Kingdom . |
| 1276941 | 6/1972 | United Kingdom . |
| 1297071 | 11/1972 | United Kingdom . |

OTHER PUBLICATIONS

The Basics of Trunked Mobile Radio, by Carol Ann Rybicki, Louis L. Taylor Barnard Johnson, Inc. Mobile Times, Oct. 1980, pp. 24–27.
IMTS System Description, Mobile Radio Department, General Electric Co., Lynchburg, Va. 24502, pp. 1–2.

Primary Examiner—Jin F. Ng
Assistant Examiner—Elissa Seidenglanz
Attorney, Agent, or Firm—Nixon & Vanderhye

[57] ABSTRACT

"Dispatch overdialing" permits radio transceivers already communicating via a repeater with other transceivers in a trunked radio communications system to call additional radio transceivers onto the communications channel in use. A radio transceiver in a first group may "dispatch overdial" another radio transceiver in a different group by transmitting a dispatch overdial begin signal to the repeater. The repeater mutes all audio communications on the channel, and the radio transceiver then transmits a sequence of identifying signals which are identical to those used to establish communications initially. The radio transceiver then transmits a further sequence of identifying signals which identify a further radio transceiver (or group of transceivers) to be called onto the channel. If the first sequence of identifying signals matches the signals which were used to establish communications initially, the repeater initiates handshake signalling to call the further transceiver(s) onto the channel. If the first sequence of identifying signals doesn't match the previously-received signals, handshake signalling is inhibited and audio muting ceases after the receipt of the further sequence of identifying signals.

35 Claims, 12 Drawing Figures

U.S. PATENT DOCUMENTS

| | | | |
|---|---|---|---|
| 4,125,808 | 11/1978 | Graham | 455/32 |
| 4,127,744 | 11/1978 | Yoshikawa et al. | 179/2 EB |
| 4,129,749 | 12/1978 | Goldman | 179/2 EB |
| 4,144,411 | 3/1979 | Frenkiel | 179/2 EB |
| 4,144,412 | 3/1979 | Ito et al. | 179/2 EB |
| 4,144,496 | 3/1979 | Cunningham et al. | 455/54 |
| 4,187,398 | 2/1980 | Stark | 179/2 EB |
| 4,228,319 | 10/1980 | De Jager et al. | 179/2 EB |
| 4,233,473 | 11/1980 | Frost | 179/2 EB |
| 4,242,538 | 12/1980 | Ito et al. | 179/2 EB |
| 4,281,413 | 7/1981 | Forrest | 455/34 |
| 4,308,429 | 12/1981 | Kai et al. | 179/2 EB |
| 4,310,722 | 1/1982 | Schaible | 179/2 EB |
| 4,347,625 | 8/1982 | Williams | 455/32 |
| 4,352,955 | 10/1982 | Kai et al. | 179/2 EB |
| 4,360,927 | 11/1982 | Bowen et al. | 455/17 |
| 4,376,310 | 3/1983 | Stackhouse et al. | 375/104 |
| 4,384,362 | 5/1983 | Leland | 455/33 |
| 4,398,063 | 8/1983 | Hass et al. | 179/2 EB |
| 4,409,687 | 10/1983 | Berti et al. | 455/7 |
| 4,435,840 | 3/1984 | Kojima et al. | 455/33 |
| 4,475,010 | 10/1984 | Huensch et al. | 179/2 EB |
| 4,553,263 | 11/1985 | Smith et al. | 455/54 |
| 4,573,206 | 2/1986 | Grauel et al. | 455/34 |

MOBILE RADIO STATION LOGIC

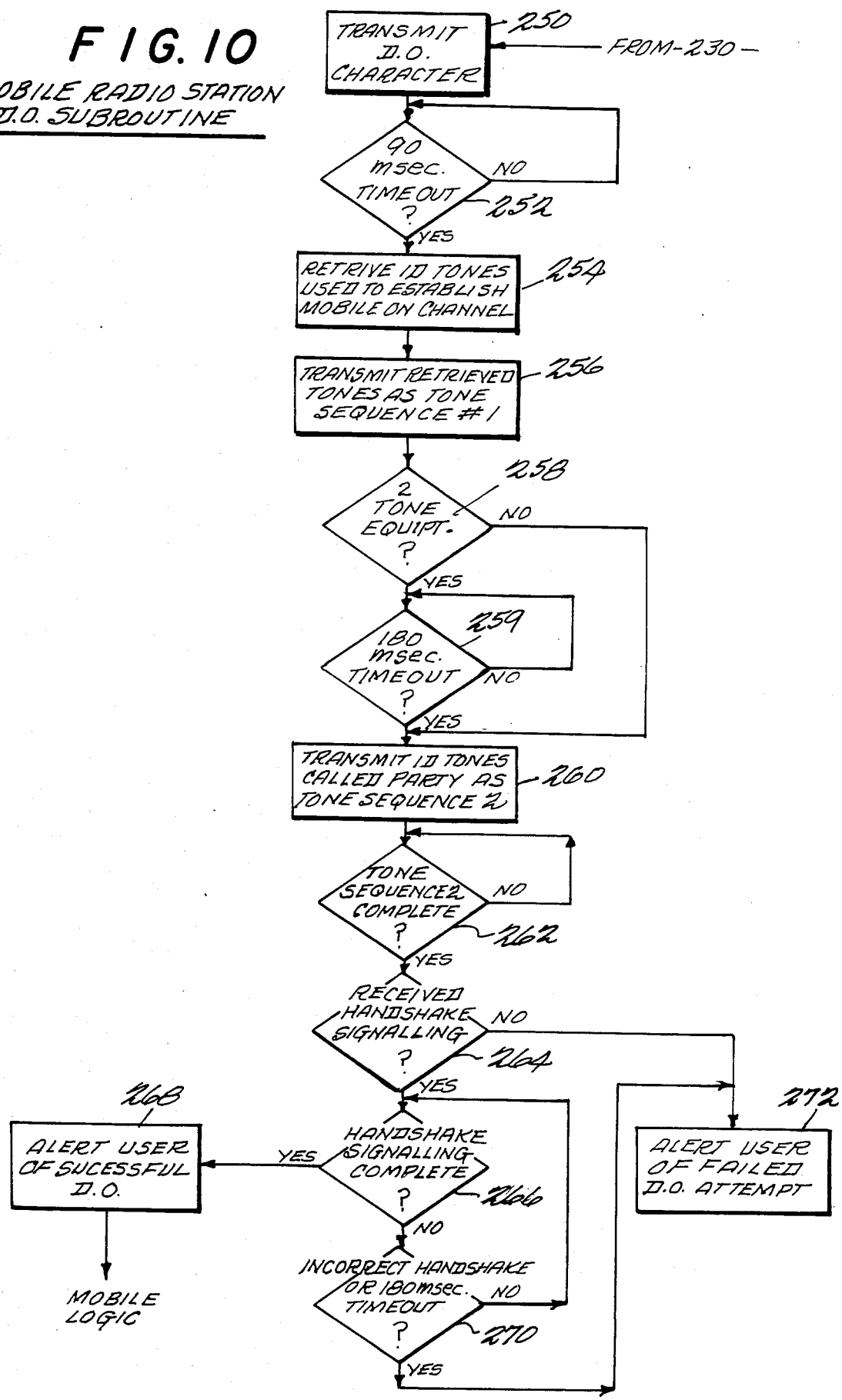

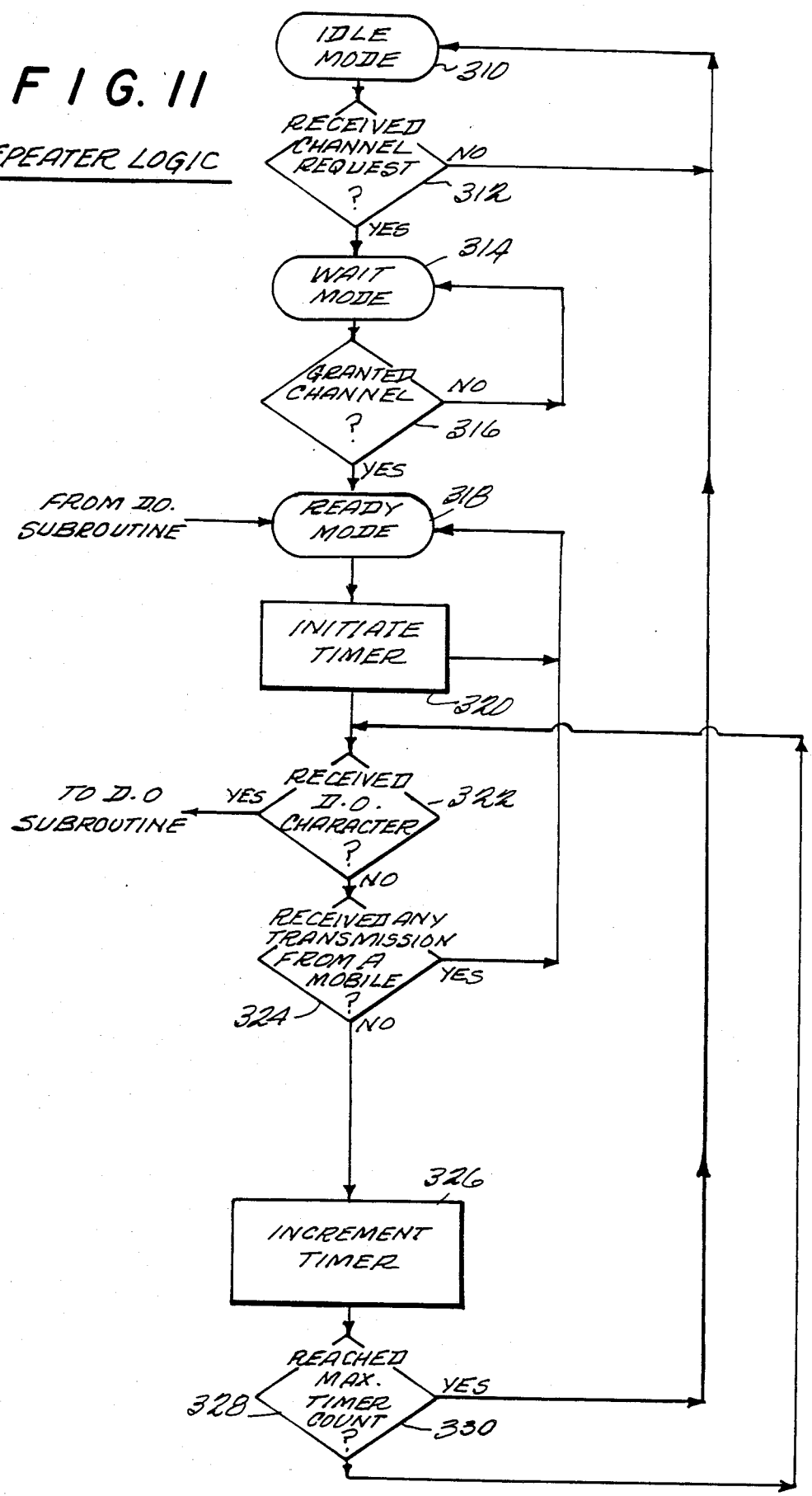

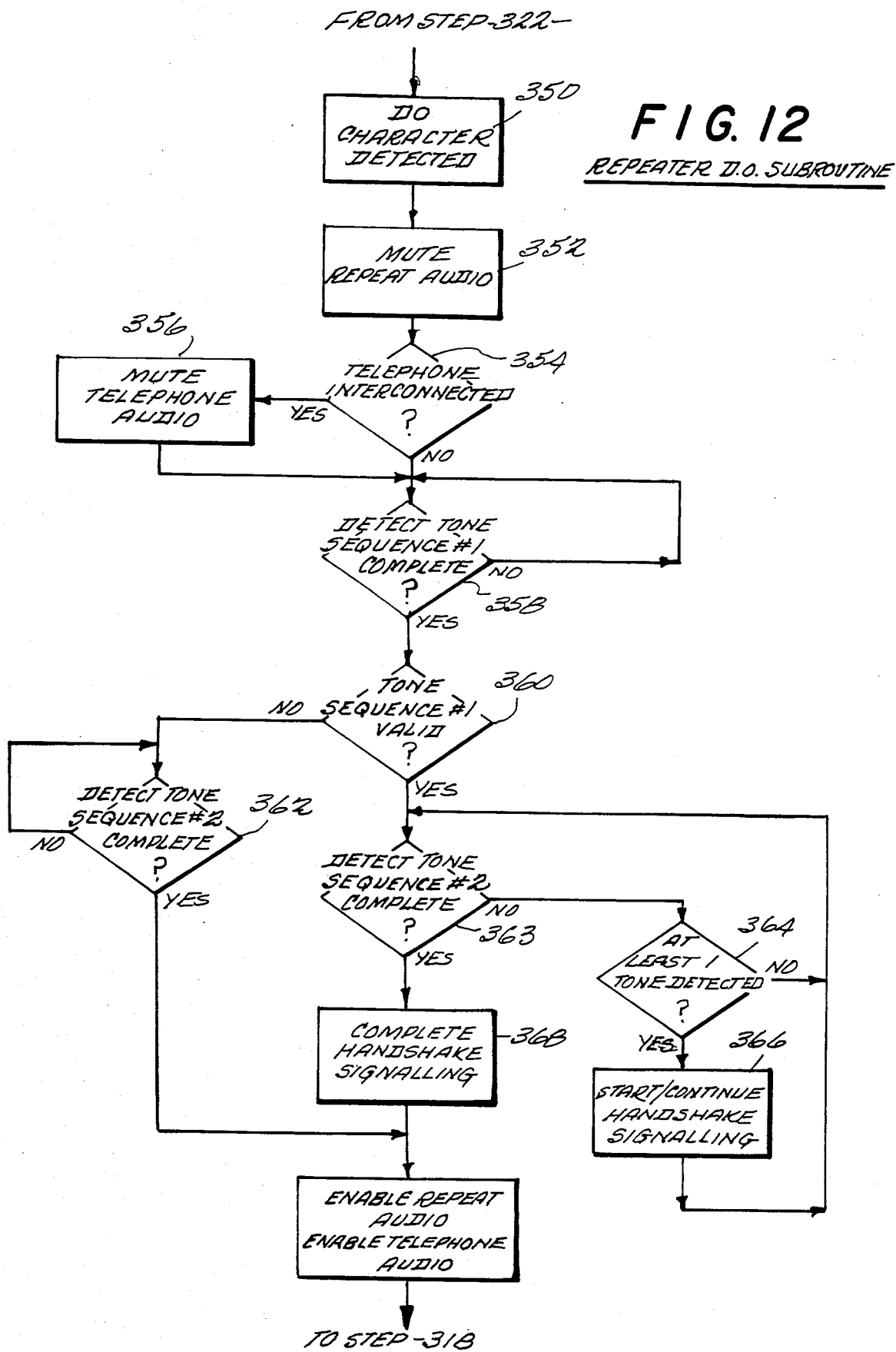

DISPATCH OVERDIALING FOR INTER-GROUP AND OTHER ADDED CALLING/CALLED ACCESS TO COMMUNICATIONS CHANNELS IN A TRUNKED RADIO COMMUNICATIONS SYSTEM

CROSS-REFERENCES TO RELATED APPLICATIONS

This application is related to copending commonly-assigned U.S. patent application Ser. No. 645,710 filed Sept. 17, 1984, now abandoned, and to copending commonly-assigned Ser. No. 721,815 filed Apr. 10, 1985 as a CIP thereof. The entirety of both these related applications is hereby incorporated by reference.

FIELD OF THE INVENTION

This invention relates to the field of trunked radio communications systems and, more particularly, to method and apparatus by which additional stations may be brought into a communication channel already acquired and dedicated to ongoing communication between two radio transceivers. This invention enables a repeater to grant or deny a request by a given transceiver which is already on an acquired communication channel, to bring other transceivers onto the communication channel. It also permits inter-group communications which are otherwise prohibited.

BACKGROUND OF THE INVENTION

Radio communications systems are known in which radio stations (commonly using transceivers) communicate with each other via a repeater which establishes a communication channel between the radio stations. The radio stations of the system are divided into a plurality of groups. Radio stations belonging to any one group may communicate freely with other radio stations in the group. In addition, if the repeater is equipped with a telephone interconnect network, the radio stations of a group may communicate with telephones outside of the group. Each radio station has an identification tone signal. The identification tone signal may be a group of sequential tones which simultaneously identifies all radio stations belonging to a single group. Alternatively, the identification tone signal may be a sub-group signal or an individual identification signal identifying subsets of the group or individual radio stations within the group.

A radio station may establish communications with one or more other radio stations by transmitting the identification tone signals of such other radio stations. Radio stations not actively engaged in communications may monitor one or more communications channels, awaiting the identification tone signals assigned to them. When a radio station receives an identification tone signal assigned to it, it may participate in communications on the channel.

Each radio station may "possess" one or more identification tone sequences (the identification tones assigned to each radio station determining which stations may be contacted by that radio station). Thus, a radio station possessing identification tones for a first and second group of radio stations may contact any radio station(s) within the first or second group, but may not contact radio stations in other groups. Each radio station may also possess sub-group and/or individual identification tones. Thus, a radio station may contact all members of another group if it possesses the identification tones for that group. The radio station may contact an individual member of a group if it possesses the individual identification tone of that member. A radio station is restricted to contacting only those stations for which it "possesses" (is programmed with) the identification tones (group tones, sub-group tones, and individual identification tones).

However, if the repeater is equipped with a telephone interconnect network, any radio station may freely communicate with any telephone outside of the group. Thus, asymmetry exists between the ability of a radio station to contact telephones outside of his group and to contact mobile radio stations outside of his group.

Such radio communications systems are disclosed in the following patents which are specifically incorporated herein by reference; U.S. Pat. No. 4,360,927 to Bowen et al issued on Nov. 23, 1982 entitled a "Repeater Trunking System"; U.S. Pat. No. 4,347,625 to Williams issued on Aug. 31, 1982 entitled "Arrangement for Cellular Operation of a Repeater Trunking System"; and U.S. Pat. No. 4,409,687 to Berti et al issued on Oct. 11, 1983 entitled "Arrangement and Method for Establishing Radio Communications in a System".

FIG. 1 is a pictorial diagram indicating the various modes of operation of a mobile radio station, as described in the above referenced patents. The operation of the mobile transceiver may be broken down into the functional modes (states) of "idle", "wait", and "ready". When power is initially applied to a mobile station, the radio station is placed in the idle mode. In the idle mode, a radio station continuously scans the communication channels for a call identifying the particular group with which it is associated. Thus, the radio station looks for identification tone sequence signals with which that radio station is associated. All audio circuits of the mobile station are inhibited in this mode so that the user is undisturbed. If a call is decoded indicating that a particular mobile station is within a group being called, that radio station is placed in a ready mode. In the ready mode, the radio station is locked onto a channel and ready to communicate. The audio circuits are enabled and an indicator lamp (not shown) is illuminated. An audible alarm (such as four alert beeps) is sounded by the radio station upon entry of the radio station into the ready mode in order to alert an operator that a call has come in.

If the repeater which has caused the mobile station to lock onto the channel goes off the air, or communication is otherwise interrupted, the radio station returns to the idle mode from the ready mode and resumes searching for calls identifying a particular group with which it is associated.

From the idle mode, if a user desires to originate a call (such as by depressing a push-to-talk (PTT) button located on, for instance, a hand-held microphone), the radio station operates in the wait mode. In the wait mode, the station stops scanning on the first idle one of the communication channels and attempts to acquire the corresponding repeater. Channel acquisition signalling protocol may be that described in commonly-assigned application Ser. No. 721,815 filed Apr. 10, 1985, or that described in U.S. Pat. No. 4,360,927 to Bowen et al. For instance, the station may send a busy signal to the repeater and wait to hear an acquisition signal. During this procedure, an indicating lamp is illuminated and the audio circuits of the mobile station are disabled. After all channels have been tried without acquiring a repeater, the radio station may inform the user that no idle communication channels are available (for instance, by sounding an audible beep).

If all channels are busy or if the mobile station has failed to establish communication with a repeater, the radio station returns to the idle mode. However, if a repeater is acquired, the radio station proceeds to transmit the desired identification signals.

FIG. 2 depicts a prior art system in which repeater network 11 establishes communications between the various stations of Groups 1, 2 and 3. Group 1, may, for example, be a fleet of oil delivery trucks, each truck containing a mobile radio. Likewise, Group 2 may be a fleet of gasoline delivery trucks and Group 3 may be a telephone answering service for Groups 1 and 2.

As depicted in FIG. 2, vehicle 1A can establish communications with vehicle 1B and/or 1C via repeater R-1 over a communications channel. Vehicle 1A uses the Group 1 tones and/or individual identification tones for contacting vehicles 1B and/or 1C. At the same time, vehicle 2A may communicate with telephone 3A via repeater R-4 and telephone interconnect network 13. However, vehicles from Group 1 are prohibited from communicating directly with vehicles from Group 2 because the Group 1 vehicles are not programmed to transmit identification tone signals of Group 2 and therefore cannot establish communications with them.

FIG. 3 depicts one method by which vehicles from Group 1 may establish radio contact with vehicles from Group 2 without transmitting the Group 2 tones. Such a method begins with vehicle 1A establishing communications with the repeater network 11 through repeater R-1. Vehicle 1A then requests a telephone line through the telephone interconnect network 13. Once the telephone line is granted, vehicle 1A requests to be connected to another telephone line within the same telephone interconnect network 13. Once this connection is made, vehicle 1A requests that communication be established with vehicle 2A through repeater R-4. Such a method, while workable, is expensive since it requires the use of two repeaters and two telephone lines to establish inter-group communications. In addition, once communication is established between vehicle 1A and vehicle 2A, no additional radio stations may be brought into this communication channel unless they belong to Groups 1 or 2.

U.S. Pat. No. 4,347,625 (referred to above) describes a system in which mobile radio stations of Group 1 can establish contact with mobile radio stations of Group 2. In such a system, vehicle 1A is programmed to selectively transmit the identification tones of vehicle 2A and/or Group 2. Thus, in such a system radio communications may be established between vehicles 1A and 2A by using a single repeater and a single communications channel. However, a limitation of such a system is that once communication is established between vehicles 1A and 2A, no additional radio stations, outside of Group 2, may be called onto the communication channel.

Thus, in the prior art, no method or apparatus exists which permits a plurality of radio stations from a plurality of groups to be brought onto a single communication channel after communication has been established between two or more stations.

Therefore, an object of the present invention is to provide method and apparatus by which a radio station which has an established communication channel (i.e., is communicating over a communications channel) with another station may dispatch overdial additional stations belonging to other groups so that a plurality of radio stations belonging to a plurality of groups may all communicate on the same communication channel.

Another object of the present invention is to provide a control method and apparatus by which such dispatch overdialing may be restricted to those members of the group which first established the communication channel. This feature prevents vehicles which have been dispatch overdialed onto the communication channel from themselves dispatch overdialing radio stations in other groups and having the communications thus established billed to the group which originally established the communication channel.

Another object of the present invention is to provide a control method and apparatus by which a vehicle which has been dispatch overdialed onto the communication channel is allowed to dispatch overdial radio stations in other groups. However, such dispatch overdial calls can be billed to the dispatch overdialing radio station instead of the group which originally established the communication channel.

Another object of the present invention is to provide method and apparatus in which a radio station from a given group may dispatch overdial a plurality of mobile radio stations and a plurality of telephones so that all mobile radio stations and all telephones can communicate on the same channel.

BRIEF DESCRIPTION OF THE DRAWINGS

These and other objects of the present invention will be readily apparent and the invention will be better understood by reference to the following detailed description considered in conjunction with the accompanying drawings, of which:

FIG. 10 is a flow chart of the mobile radio station dispatch overdial logic subroutine control function steps in accordance with the present invention;

FIG. 11 is a flow chart of relevant control function steps performed by the repeater in accordance with the present invention; and FIG. 12 is a flow chart of the repeater dispatch overdial logic subroutine control function steps in accordance with the present invention.

DETAILED DESCRIPTION OF THE PREFERRED EMBODIMENT

Figure 4:
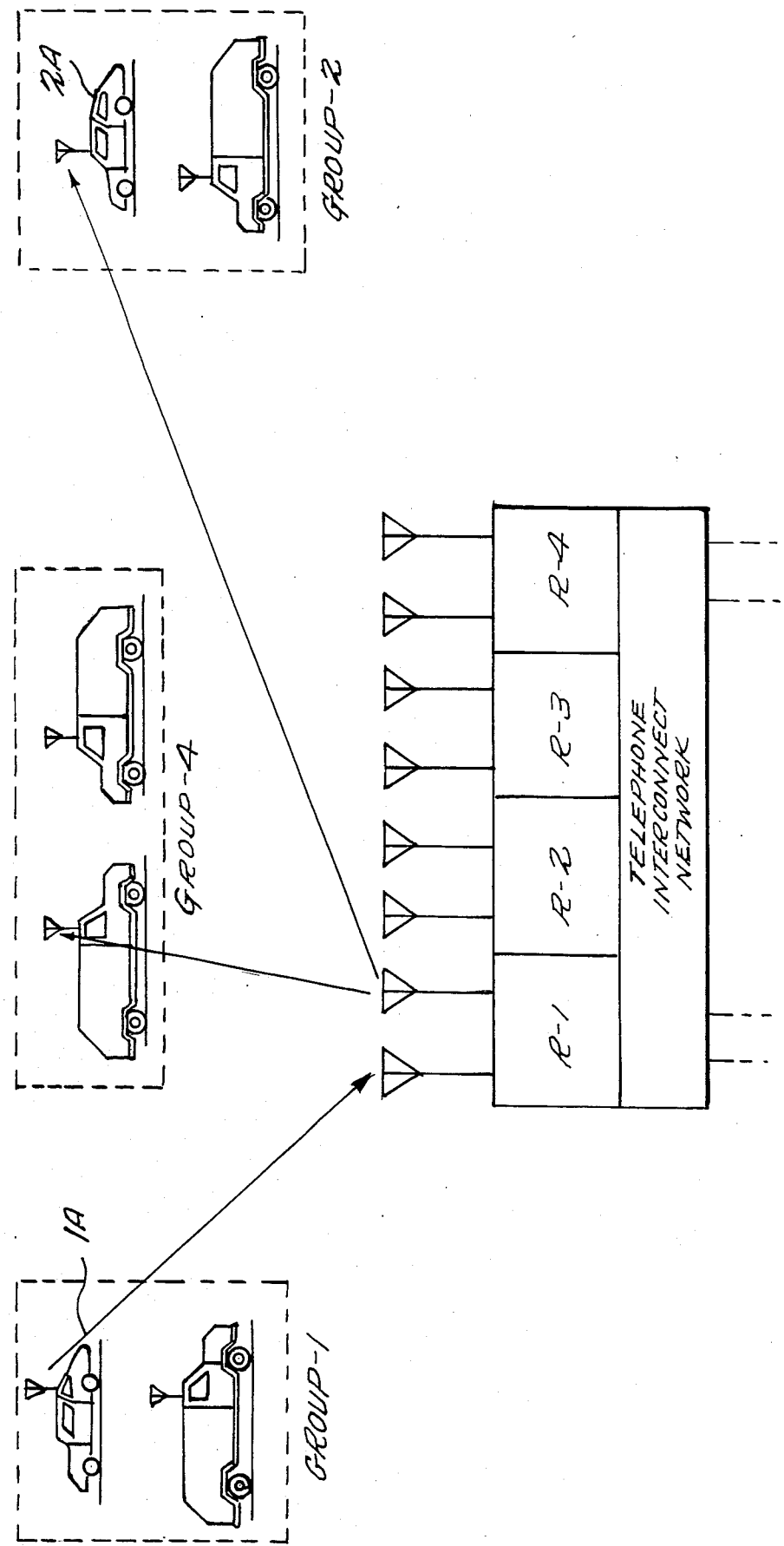
FIG. 4 depicts a radio communications system according to the present invention and a method of communication therein.

FIG. 4 depicts a radio communications system according to the present invention. In the exemplary system shown in FIG. 4, all mobile radio stations and all repeaters have been provided with the dispatch overdial feature of the present invention. The dispatch overdial feature may be implemented in software or firmware within each of the radio stations and the repeaters.

As shown in FIG. 4, vehicle 1A may establish radio communications with vehicle 2A so long as vehicle 1A is programmed to transmit the identification tone of vehicle 2A. Vehicles 1A and 2A may then conduct two-way communications via repeater R-1. This features is taught in U.S. Pat. No. 4,347,625 (referred to above).

According to the present invention, vehicle 1A can dispatch overdial vehicle 4A and have this radio station join in the already established communication channel between vehicles 1A and 2A. Thus, a radio communication conversation can take place between the three parties (vehicles 1A, 2A and 4A) via repeater R-1. Likewise, vehicle 1A can continue to dispatch overdial ("chain" dispatch overdial) to acquire any number of additional radio stations or telephones on the communications channel. Vehicle 1A thus may bring as many stations onto the communication channel as it has identification tones for. To assist vehicle 1A in communicating with radio stations and telephones outside of its group, vehicle 1A may be provided with a directory listing the identification tones of all desired communications targets. Vehicle 1A could also be outfitted with an automatic dialer which stores the identification tone signals of desirable communication targets. Such automatic dialers are well known in the art and will not be further described herein.

Figure 3:
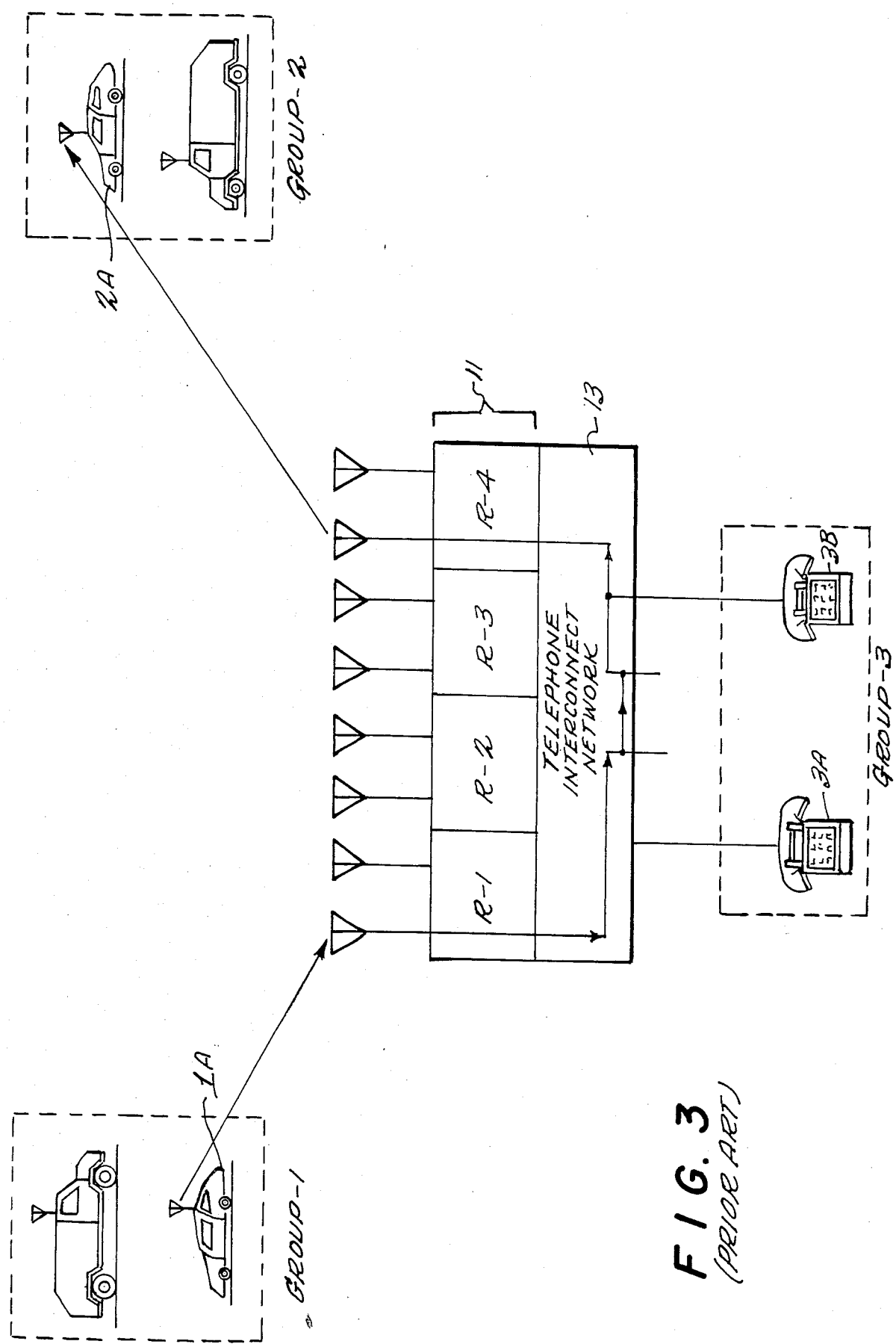
FIG. 3 depicts a prior art radio communications system and a method for communication therein.
Figure 5:
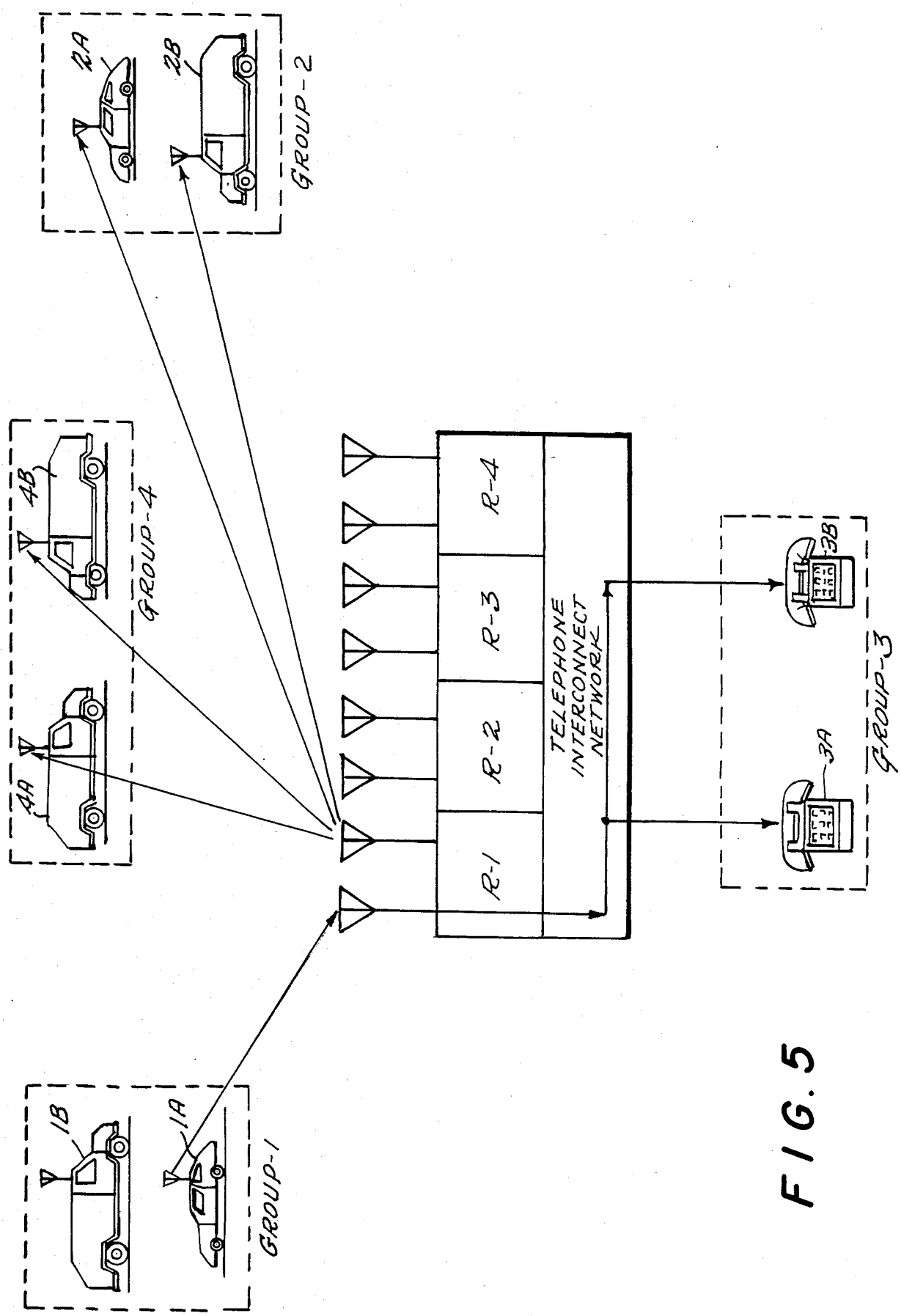
FIG. 5 depicts a radio communications system according to the present invention and methods of communication therein.

FIG. 5 depicts a radio communications transaction according to the present invention in which vehicle 1A establishes communications over a communication channel with vehicle 2A, much as described in FIG. 3. However, in this transaction vehicle 1A has transmitted the identification tone signals of the entire Group 2 and therefore is in communication with both vehicles 2A and 2B. Thus, the communication channel was established using Group 2 tones. Next, vehicle 1A dispatch overdials vehicles 4A and 4B by transmitting the Group 4 identification tone signal. Now, all members of Group 4 join the existing communications channel. In a like fashion, vehicle 1A can dispatch overdial telephones 3A and/or 3B.

Such a dispatch overdial by vehicle 1A is permissible since it "possesses" (ie., is programmed to transmit) the Group 2 identification tones which were used to establish the original communications channel and the Group 4 tones required to dispatch overdial Group 4. Any dispatch overdialing performed by vehicle 1A or a member of Group 2 may be billed to Group 2 because Group 2 tones were used to initiate the original communication (assuming that the repeater has the capability to bill for resources used). Likewise, any member of Group 2 can perform a dispatch overdial since all members possess the group tones which were used to establish the communication channel.

It can be seen that either one of the two radio stations which establish the original communication channel will be allowed to dispatch overdial since both of these stations must necessarily be programmed to transmit the identification tones which establish the channel. If, in the above example, Group 2 radios were also programmed to transmit Group 1 tones, and vehicle 1A has established communication with vehicle 2A using Group 1 tones, then all members of Groups 1 and 2 could dispatch overdial members of Group 4, with billing being directed to Group 1, since Group 1 tones initiated the connections.

As can be appreciated from the above example, it would not be desirable to permit vehicle 4A to dispatch overdial members of another group since the Group 1 tones were used to establish the initial communications channel and Group 1 is being billed for all communications on this channel. This feature is incorporated in the presently preferred embodiment of the invention. However, an alternative embodiment allows vehicle 4A to dispatch overdial in such a situation, but in this embodiment the repeater may bill such calls to Group 4 instead of Group 1.

Figure 6:
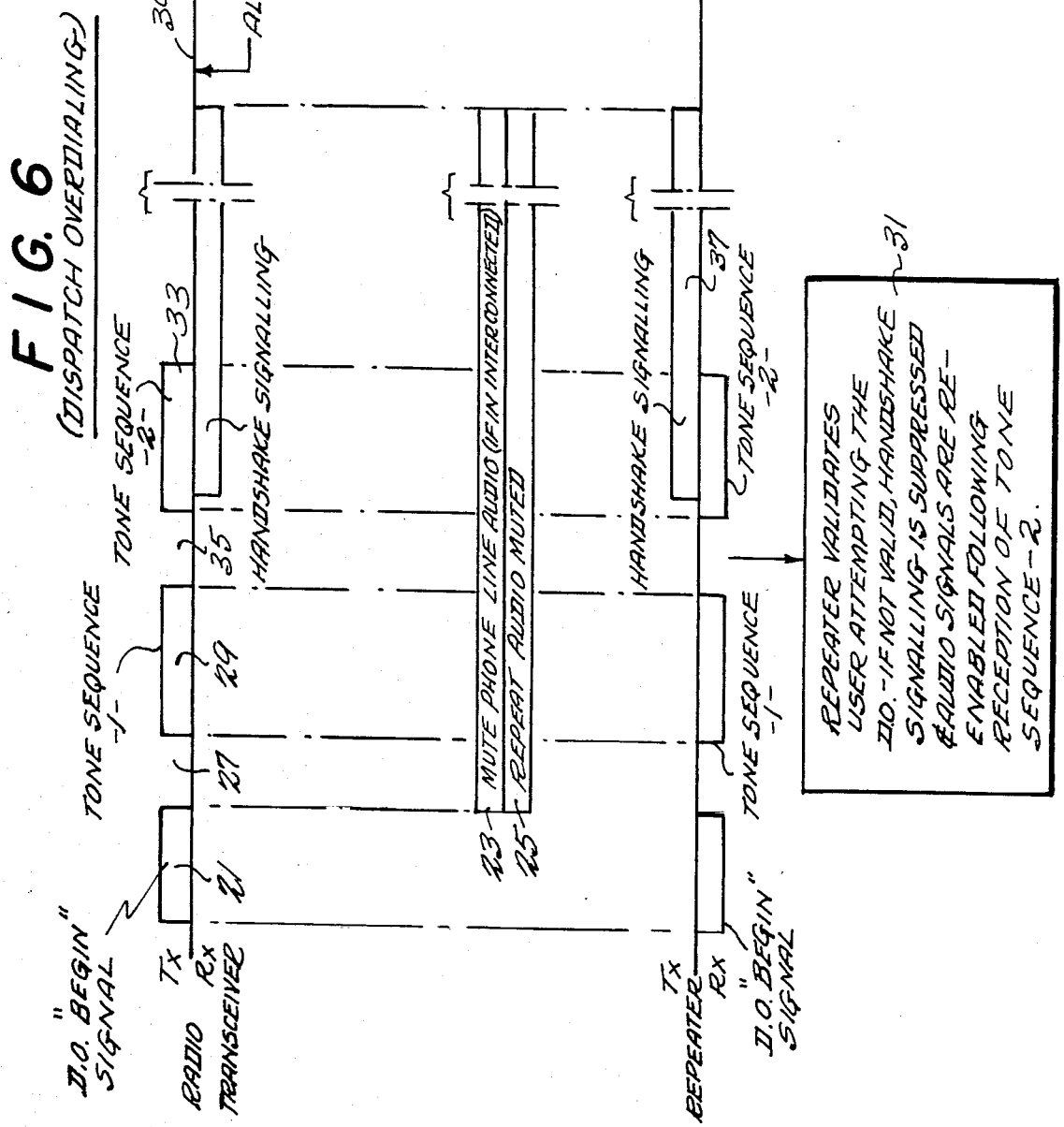
FIG. 6 depicts dispatch overdial signalling sequences between a radio station and a repeater.

FIG. 6 depicts the signalling sequence between a radio station and a repeater according to the present invention. This signalling sequence ensures that unauthorized radio stations cannot dispatch overdial (or are correctly billed therefor) on a radio communication channel established by another group.

A radio station attempting to dispatch overdial transmits a dispatch overdial (D.O.) begin signal 21 to the repeater. The repeater receives this signal and immediately mutes all audio communications existing on the communication channel, e.g. by simply disconnecting the input of its transmitter from the output of the receiver and from the output of any interconnected telephone lines. The repeater will mute the phone line audio 23 if a telephone is interconnected in the communication channel. The repeater will mute the repeat audio 25 if radio stations are established on the communication channel. Such muting by the repeater is important since this prevents other stations on the channel from hearing (and possibly stealing) the tone sequences which are to follow. Such muting will also prevent radio stations from "falsing" on the tone sequences which follow. Such falsing occurs when a radio station confuses audio tones with actual handshake signals which are meant to activate the radio stations. After a predetermined period of time 27, the radio transmits a tone sequence 1, at 29. Gap 27 is provided so that the repeater does not confuse the D.O. begin signal with the beginning tones of the tone sequences which follow. Otherwise, the repeater may begin the tone detection process used to detect tone sequence 1 during the D.O. begin signal.

Referring back to FIG. 5, it will be recalled that vehicle 1A established an initial communication channel with Group 2 by transmitting the Group 2 tones. Vehicle 1A then dispatch overdials Group 4 using the Group 4 identification tones. Thus, vehicle 1A, Group 2, and Group 4 can all be present on the same communication channel. Now, any station on the communication channel may attempt to dispatch overdial stations in other groups and bring them onto the communication channel. To discriminate between authorized and unauthorized stations attempting to dispatch overdial, each station attempting to dispatch overdial must transmit a tone sequence 1 to the repeater.

A radio station will transmit, as tone sequence 1, those tones which were used to establish that radio station on the communication channel. Thus, if Vehicle 1A originally establishes the communications channel using Group 2 tones, vehicles from Group 2 would broadcast, as tone sequence 1, the group tones from Group 2. However, if a Group 4 vehicle attempted to dispatch overdial it would broadcast, as tone sequence 1, the group tones of Group 4 since these tones were the ones that were used to bring group 4 onto the communication channel. The repeater receiving the Group 4 tones as tone sequence 1 will thus be alerted that a Group 4 vehicle is attempting to dispatch overdial on a communication channel originally established by (and being billed to) Group 2 tones. The repeater can be configured so as to disallow such an attempt or, in an alternative embodiment, to permit this attempt but to bill the dispatch overdial to Group 4. Thus, after receiving tone sequence 1, the repeater, at 31, will validate the user attempting to dispatch overdial. A valid tone sequence 1 consists of those tones which were used to establish the original communication channel. In the presently described exemplary embodiment, if the tone sequence 1 is detected as being not valid, the repeater continues to suppress the audio and will also suppress all handshake signalling so that the invalid dispatch overdialing may be prevented.

Referring back to FIG. 6, after transmitting tone sequence 1, the radio station transmits tone sequence 2, at 33, to the repeater. Tone sequence 2 is the identification tone signal of the group or individual being called. A period of time 35 may be provided between the transmission of tone sequences 1 and 2. In this way, the dispatch overdial feature can support systems having varying lengths of identification tone sequences. For instance, the radio communications systems described in the co-pending applications incorporated herein by reference have identification tone signals including two tones or four tones. In the case of a two tone identification tone sequence, gap 35 may be inserted between tone sequence 1 and tone sequence 2. However, if the radio communication system has four tone identification tone sequences, gap 35 may be small or nonexistent.

In the preferred embodiment, if the repeater determines that the dispatch overdial requester is valid (i.e., the requester's tone sequence 1 were the tones used to establish the communications channel), the repeater begins transmitting handshake signalling 37 in order to bring the called radio station onto the communication channel. This handshake signalling is more fully described in copending CIP application Ser. No. 721,815 filed Apr 10, 1985.

As depicted in FIG. 6, the repeater continues to mute phone line audio 23 and/or repeat audio 25 until handshake signalling 37 is completed. If the attempt to dispatch overdial is invalid, the repeater will cease muting the audio at the completion of tone sequence 2 so that audio communications already existing on the communication channel may continue. Thus, an established communication channel will not be disrupted by an invalid attempt to dispatch overdial.

After handshake signalling 37 has been completed, or after tone sequence 2 has been completed after an invalid dispatch overdial attempt, the radio attempting to dispatch overdial is alerted at 39 of his success or failure to dispatch overdial. If successful, the called station will come up on the channel. If unseccessful, an indication (such as an audio beep) will be provided to the requester.

The present invention is compatible with the radio communication systems described in the patents and co-pending applications incorporated herein by reference. In such systems, a radio station could establish communication with a telephone via the repeater and the telephone interconnect network. Therefore, if vehicle 1A has dispatch overdialed vehicle 4A and brought it onto the communications channel which was established with Group 2 tones, there is nothing to prevent vehicle 4A from dispatch overdialing (via the telephone interconnect network) telephone stations such as 3A and 3B. To prevent this from happening, the repeater senses (remembers) that a dispatch overdial has already been performed on the communications channel and will expect identification tones (similar to tone sequence 1) to be transmitted by any station on the communications channel requesting an interconnect with a telephone station. The repeater may be programmed to either prevent such as interconnect attempt or to bill the interconnect to the group or vehicle which requests it.

Thus, a radio communications method and apparatus has been described in which a radio station belonging to one group may dispatch overdial radio stations and/or telephone stations belonging to other groups so as to bring all desired stations onto the same communications channel. This is performed without the need of a central controller or a human dispatcher and does not require dropping and reacquiring a channel or reconfiguring existing radio stations. At the same time, the repeater is programmed so that any group which attempts to dispatch overdial on the already established communications channel will be prevented from (or correctedly billed for) performing the dispatch overdial unless that radio station requesting the dispatch overdial was brought onto the channel with the identification tones which established the communication channel originally.

Figure 7:
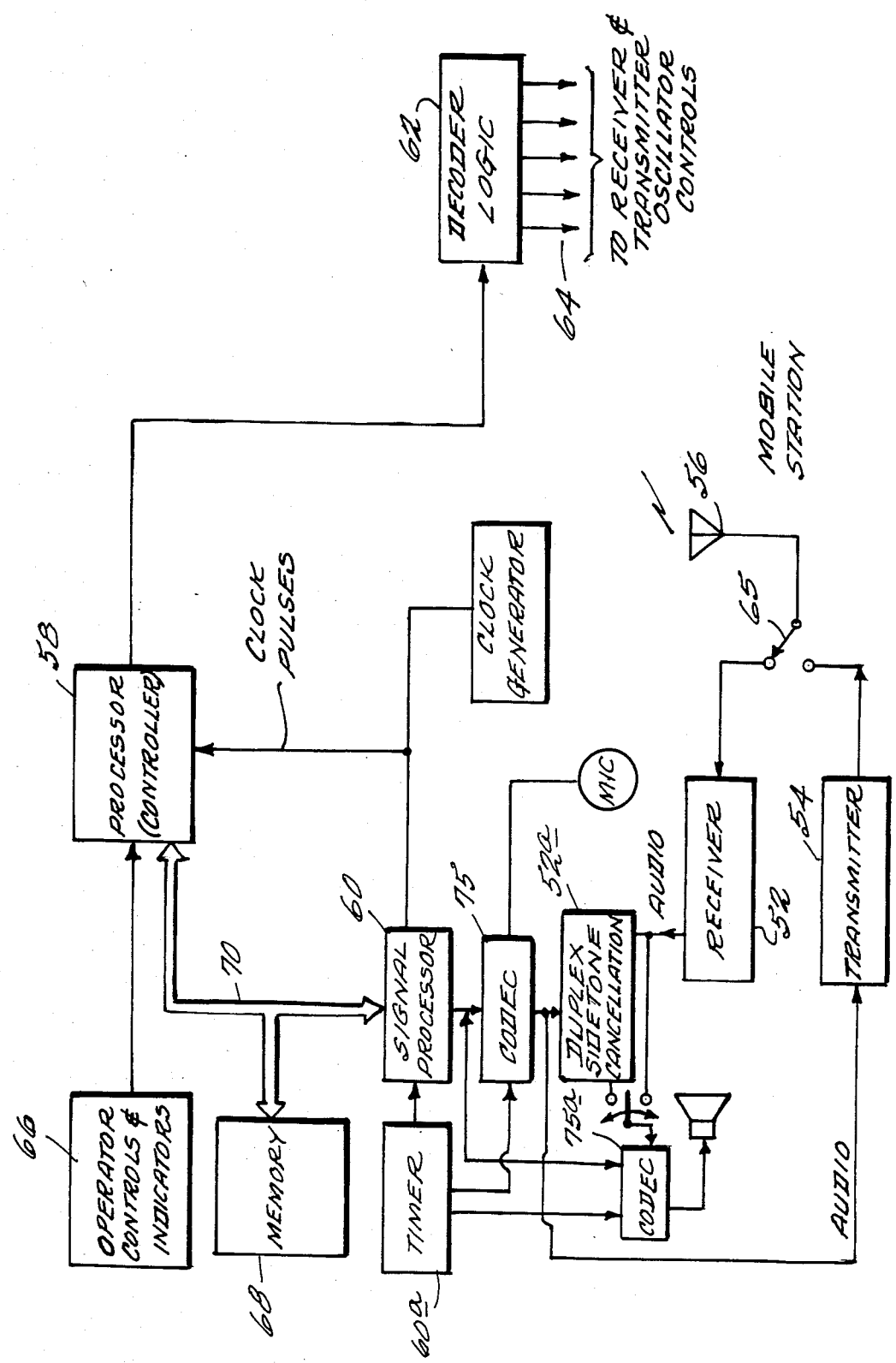
FIG. 7 is a block diagram of a mobile station in accordance with the present invention.

FIG. 7 is a block diagram of a mobile radio station in accordance with the present invention. It is assumed that the mobile station is installed on board one of the vehicles shown in FIGS. 2-5.

The radio station includes a receiver 52, a transmitter 54, an antenna 56, a processor 58, and a signal processor 60. Receiver 52 and transmitter 54 are capable of operating on any of the communication channels available through any of the repeaters depicted in FIGS. 2-5. The signal antenna 56 may be switched by relay 65 (or some other suitable switching device) between transmitter 54 and receiver 52 depending upon whether the radio station is transmitting or receiving.

Receiver 52 and transmitter 54 maybe frequency modulation devices (although they may be modulated using other convenient methods, such as amplitude modulation). Transmitter 54 includes a conventional oscillator circuit (not shown) which operates at one of five transmit frequencies depending upon the signal applied to it by decoder logic 62. Receiver 52 is preferably of the superheterodyne type and includes a local oscillator which also operates at a frequency corresponding to one of five frequencies depending upon the signal supplied by decoder logic 62. Decoder logic 62 is connected to an output of processor 58 (which monitors and controls the state of the radio station), as well as controlling the operation of signal processor 60. Processor 58 applies signals to decoder logic 62 which causes the decoder logic to sequentially produce frequency scanning signals at each of the outputs 64 in a well-known manner. These scanning signals are applied to the oscillators of receiver 52 and transmitter 54 to cause them to be operable on a plurality of radio frequencies. Of course, decoder logic 62 could comprise a sequential machine which is simply enabled or disabled by processor 58, or the processor could directly control the oscillator frequencies of receiver 52 and transmitter 54 by writing information to digital data ports on the receiver and the transmitter.

Figure 1:
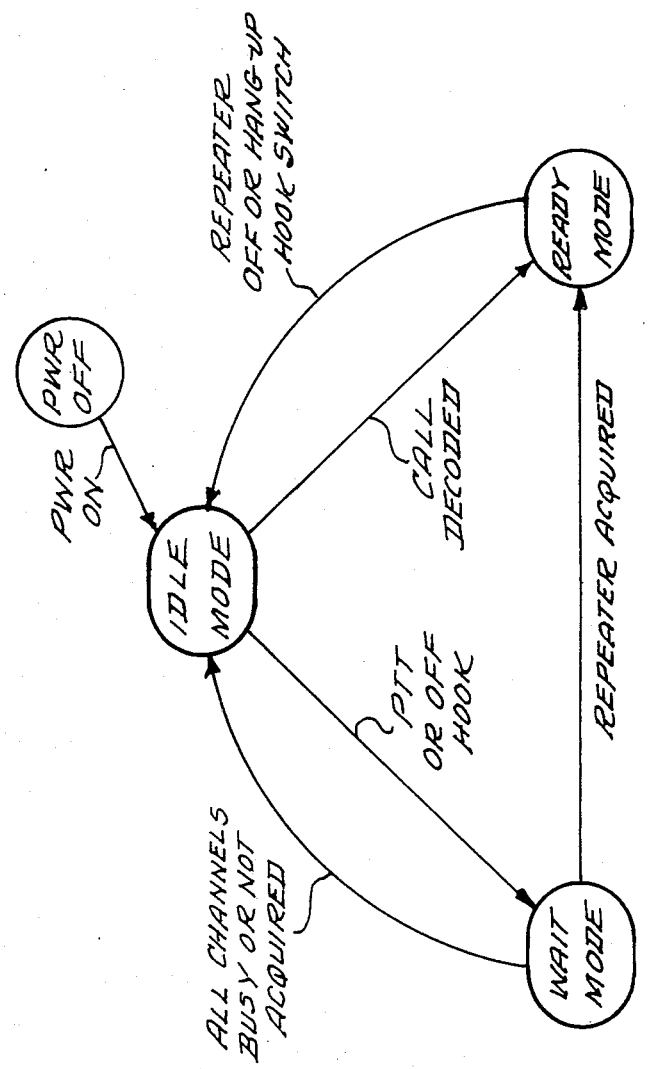
FIG. 1 depicts the operational mode of a prior art radio transceiver.
Figure 2:
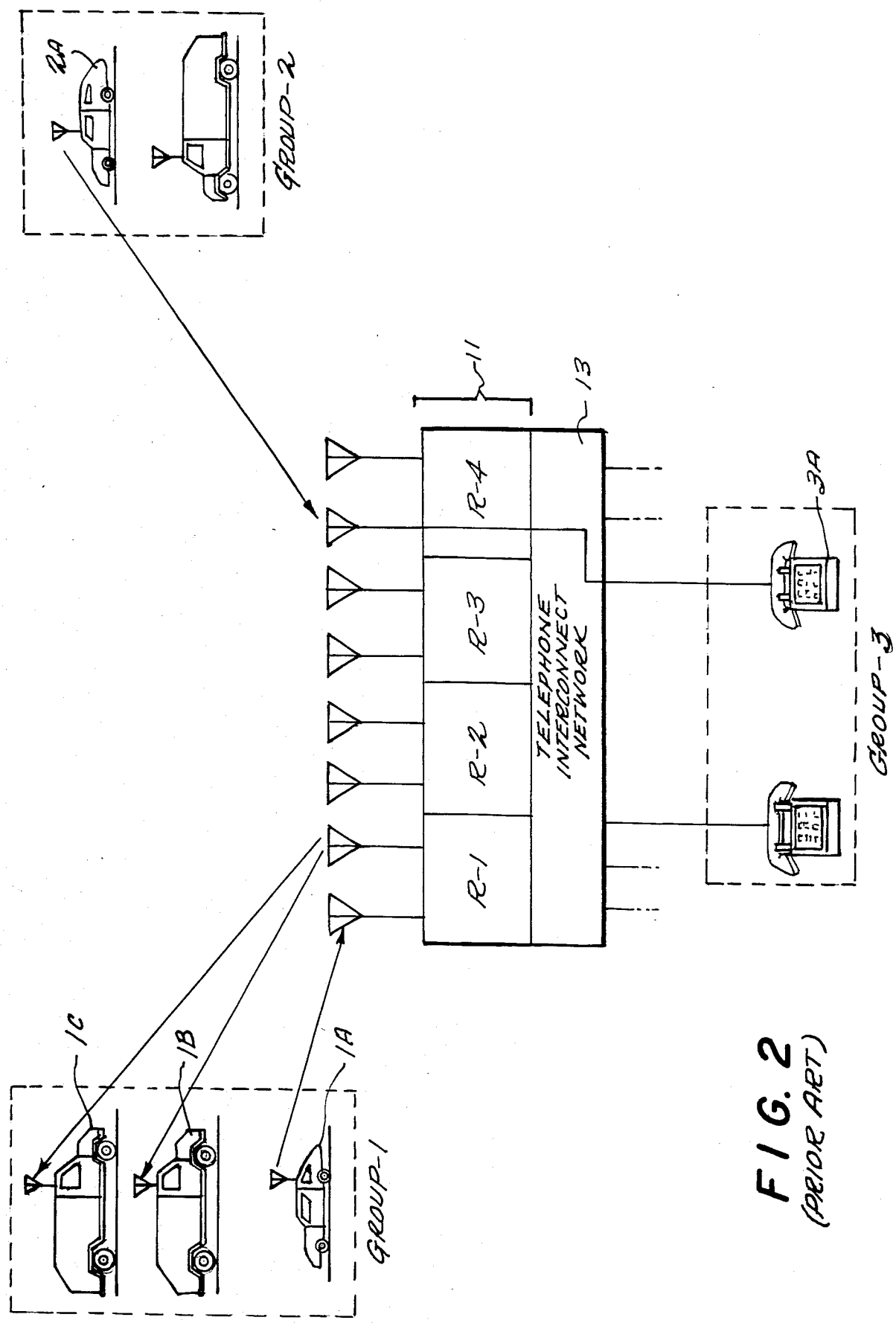
FIG. 2 depicts a prior art radio communications system and methods of communication therein.

The radio station includes operator controls and indicators 66 which enable a user to operate the mobile station and to have indications of the status of the station. The user controls permit the operator to place his or her station in one of the modes depicted in FIG. 1.

The heart of the mobile radio station is processor 58 and signal processor 60 and the interaction between the two of them. Processor 58, signal processor 60, and a memory 68 (e.g., a "personality" defining PROM which, among other data, may store particular identification tone signals S1, S2, S3, and S4, and also may store the particular identification tone signals which were used by that radio station to be established on a particular communication channel) communicate with one another over a conventional bi-directional data bus 70. Processor 58 may write information to signal processor 60 and read information from signal processor 60 via data bus 70. Processor 58 may read (and write) information from (to) memory 68 (which preferably comprises a conventional random access or read only memory) via bus 70. If desired, an additional address bus (not shown) may be used by processor 58 to address specific locations in memory 68 and specific control registers in signal processor 60.

Signal processor 60 is a special large-scale integration (LSI) general programmable signal-processing device capable of performing a wide variety of tone generation and filtering functions.

The operation and architecture of CODECs 75, 75a, time circuits 60a, and duplex side tone cancellation circuits 52a are believed to be self-explanatory to those skilled in the art. In the conventional architecture shown, each of the CODECs 75, 75a may at times function as an A/D converter and at times function as a D/A converter, in a well known manner.

Signal processor 60 performs all necessary filtering on signals being transmitted and received. Signal processor 60 also detects and/or generates one of 38 possible tones at frequencies, times, and durations specified by processor 58. Finally, signal processor 60 is used to detect and/or generate tones for signalling applications other than those associated with the signalling sequence between the mobile radio station and the repeater (such as for touch-tone dialing onto a standard land line, for billing, and other information transmittal, for increased security of transmissions, etc.).

A more detailed explanation of the operation of the mobile radio station is contained in the co-pending CIP application Ser. No. 721,815, filed Apr. 10, 1985 incorporated herein by reference.

Figure 8:
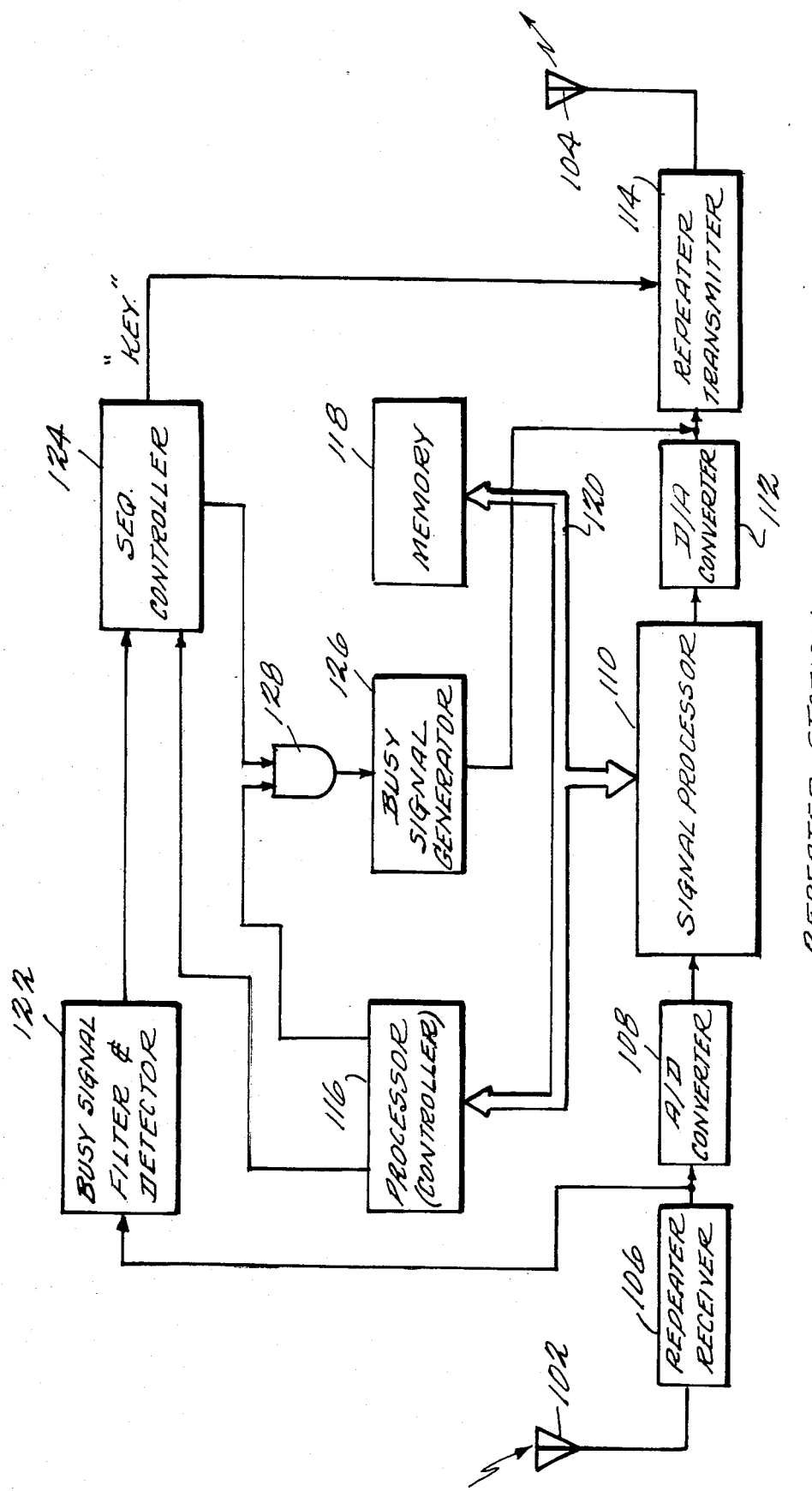
FIG. 8 is a block diagram of a repeater station in accordance with the present invention.

FIG. 8 is a block diagram of a repeater station in accordance with the present invention. In this repeater, an antenna 102 is used for receiving signals transmitted by mobile radio stations. Another antenna 104 is used to transmit signals to the mobile radio stations. In the preferred embodiment, the repeater is capable of operating in the full duplex mode (i.e., it can receive and transmit signals simultaneously).

Receiving antenna 102 is coupled to the input of a repeater receiver 106, conventional in design, which receives and demodulates the information received by the antenna 102. The output of repeater receiver 106 is coupled to an A/D converter 108 which digitizes the output in a conventional fashion. The digitized output produced by A/D converter 108 is applied to an input signal processor 110. The output of signal processor 110 is connected to the input of a D/A converter 112 which converts the digital output of the signal processor to an analog signal and applies it to the input of a repeater transmitter 114. Repeater transmitter 114 produces a radio frequency carrier modulated by the audio information applied to its input, and applies the modulated carrier to transmitting antenna 104.

Signal processor 110 is connected to a controller processor 16 and a memory 118 via a bi-directional data bus 120. Processor 116, memory 118, and signal processor 110 communicate via data bus 120.

Signal processor 110 is used to generate tones and to digitally filter (and otherwise process) the output of repeater receiver 106. Signal processor 110 can produce a tone and process an audio signal simultaneously.

The output of repeater receiver 106 is also connected to the input of a busy signal filter and detector 122. Busy signal filter and detector 122 is preferably a bandpass filter which produces an output when a busy signal is present on the output of repeater receiver 106. The output of busy signal filter and detector 122 is applied to the input of a sequential controller 124, the function of which is to control the other portions of the repeater. Busy signal generator 126 is activated by controller processor 116 and sequential controller 124 via gate 128 to provide a busy signal to repeater transmitter 114.

Memory 118 is capable of storing the identification tones of mobile radio stations which communicate through the repeater. Thus, memory 118 stores the identification tone signals which are used to establish the original communication channel between two mobile radio stations.

A more detailed explanation of the circuitry of the repeater station may be found in the co-pending CIP application Ser. No. 721,815 filed Apr. 10, 1985.

Figure 9:
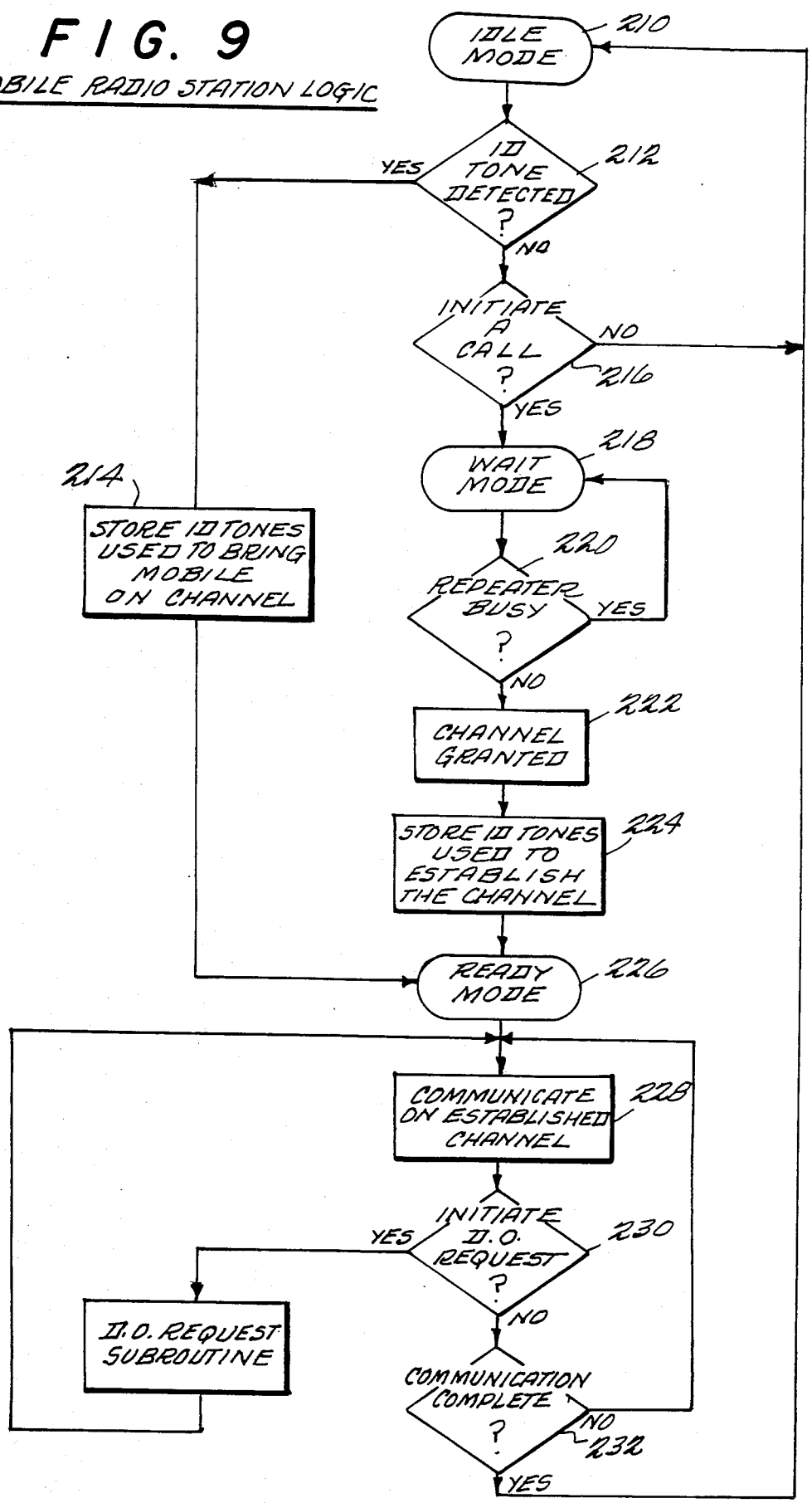
FIG. 9 is a flow chart of relevant control function steps performed by the mobile radio station in accordance with the present invention.

FIG. 9 depicts the flow chart of the mobile radio station logic. The mobile radio stations begins in an idle mode 210 where power is applied to the radio station and the radio station is awaiting a call or awaiting for the operator to initiate a call himself. If the radio station detects identification tones which indicate that the radio station is being called at step 212, the mobile radio station will store, at step 214, those identification tones used by the mobile radio station to be established on the communication channel.

If the radio station does not detect identification tones directed to it, the radio station determines, at step 216, whether the operator wishes to initiate a call. If the operator does not wish to initiate a call, the mobile radio station remains in the idle mode. If the operator does wish to initiate a call the radio moves to the wait mode at step 218.

In the wait mode, the mobile operator has initiated a request for an idle repeater and the party he wants to call. This step is performed by transmitting an appropriate two or four tone signalling sequence as described in the co-pending CIP application Ser. No. 721,815 filed Apr. 10, 1985. At step 220, the mobile radio station determines whether the repeater is busy. If the repeater is busy, the mobile radio station remains in the wait mode. If the repeater is not busy, a communication channel is granted to the repeater at step 222. Next, the mobile radio station will store the identification tones used by that radio station to establish the communication channel.

After the pertinent identification tones are stored, at step 214 or at step 224, the mobile radio station is in the ready mode 226 and is ready for communication. The mobile radio station will thus communicate on the established channel at step 228.

While communicating, the mobile radio station will determine whether the user wishes to initiate a dispatch overdial request at step 230. If the user does request a dispatch overdial, the dispatch overdial request subroutine is called up for execution. If the user does not wish to initiate a dispatch overdial request, the mobile radio station determines whether the communication is complete, at step 232. For example, the repeater may determine that a predetermined period of time has elapsed since voice or other information has been transmitted over the channel. If the communication is not complete, the mobile radio station remains in the ready mode and can communicate on the established channel. If it is determined that the communication has been completed, the mobile radio station will return to the idle mode at step 210.

FIG. 10 is a flow chart depicting the mobile radio station dispatch overdial request subroutine referred to above. This subroutine is entered from step 230 of FIG. 9. The subroutine begins with the transmission, by the mobile radio station, of a dispatch overdial begin character, at step 250. The radio station then enters a 90 msec timeout loop 252 (which produces gap 27 described in FIG. 6) in order to insure that the repeater does not mistake overdial characters for characters belonging to tone sequence 1, or handshake signalling. After the 90 msec timeout, the mobile radio station retrieves the identification tones (stored in step 214 or 224) used to establish that radio station on the communication channel at step 254.

At step 256, the mobile radio station transmits the retrieved identification tones as tone sequence 1. Next, the mobile radio station determines whether it is equipped as a 2-tone radio station at step 258. If the radio station is not a 2-tone station, the flow chart proceeds to step 260. If the mobile radio station is a 2-tone station, a 180 msec timeout loop is entered at step 259 to produce the gap 35 described n FIG. 6. This timeout loop ensures that the repeater can accurately discriminate between tone sequence 1 and tone sequence 2. If the transmitting radio station is a two-tone station and no gap 35 is provided, the repeater may confuse the tones of tone sequence 2 with the last two tones of a four-tone tone sequence 1.

At step 260, the mobile radio station transmits the identification tones of the called party to bring that party onto the existing communication channel. These identification tones comprise tone sequence 2.

At step 262, the radio station waits until tone sequence 2 has been completed. Upon completion of tone sequence 2, the radio station determines, at step 264, whether the handshake signalling (being generated by the repeater to contact the called party) is being transmitted by the repeater. Since the radio station is already on the channel, it can readily determine whether such handshake signals are, in fact, being transmitted by the repeater. If the handshake signalling is not being received, the user is alerted at 272 of a failed dispatch overdial attempt. If the radio station is receiving the correct handshake signalling, the radio station determines whether the handshake signalling is complete at step 266. If the handshake signalling is complete, the user is alerted of a successful dispatch overdial at step 268. If, the handshake signalling is not complete it is determined, at step 270, whether the handshake signalling received is incorrect, or whether a 180 msec timeout loop has been completed. If the handshake signalling was incorrect, or if the timeout loop is completed, the user is alerted of a failed dispatch overdial attempt at step 272. If the handshake signalling is correct, or if the 180 msec timeout is not complete, the radio station returns to determining whether the handshake signalling is complete at step 266.

FIG. 11 depicts the flow chart of the repeater logic. At 310, the repeater is in the idle mode and inactive but available for any traffic. At step 312, the repeater determines whether it has received a channel request. If a channel request has not been received, the repeater remains in the idle mode. If the repeater has received a channel request, the repeater enters the wait mode at step 314. In the wait mode, the repeater has been acquired by a requesting mobile radio station.

At step 316, the repeater determines whether it has granted a channel to the requesting radio station. If the channel has not been granted, the repeater remains in the wait mode. If the repeater has granted a channel to a requesting radio station, the repeater enters the ready mode at step 318. In the ready mode, the repeater is prepared to repeat communications between parties on the communication channel.

At step 320, the repeater initiates a timer which will force the repeater off the air if there is not sufficient activity on the channel. At step 322 the repeater determines whether it is receiving a dispatch overdialing request from a mobile radio station. If the repeater is receiving the dispatch overdial request, the repeater will enter the dispatch overdial subroutine. If the repeater is not receiving the request, then the repeater determines at step 324 whether it has received any transmission from any mobile on the channel. If there has been some activity, the repeater remains in the ready mode but the timer is reset. If the repeater has not detected any mobile activity, the timer is incremented (step 326). In step 328, if the timeout limit is reached, the repeater drops the channel.

FIG. 12 is a flow chart depicting the repeater dispatch overdial subroutine. This subroutine is entered through step 322 of FIG. 11.

The dispatch overdial subroutine begins at step 350 with the detection, by the repeater, of the dispatch overdial begin character. At 352, the repeater will mute the audio on the communication channel. At step 354, the repeater will determine whether a telephone is interconnected on the established communication channel. If such a telephone is interconnected, the repeater will mute the telephone audio at step 356. If a telephone is not interconnected on the communication channel, the repeater proceeds to step 358 where it determines whether a tone sequence 1 has been completely detected. Tone sequence 1 is completely detected when either of the following occurs:

(1) a new tone has not been detected within 180 msec from the detection of the previous tone; or (2) the last tone of tone sequence 1 has just been detected.

The wait loop around step 358 indicates that the repeater will continue to look for a completed tone sequence 1. When tone sequence 1 is detected as being complete, the repeater will determine, at step 360, whether the tone sequence 1 is valid. A valid tone sequence 1 will be the same tone sequence that was used to originally establish the communication channel. If tone sequence 1 is detected as being not valid, the repeater proceeds to step 362 and waits for the completion of tone sequence 2. This will allow the repeater to reenable the audio at the completion of tone sequence 2 if the dispatch overdial attempt is invalid. Thus, communications on the channel will not be disrupted by an invalid attempt to dispatch overdial. If tone sequence 1 is detected as being valid, the repeater proceeds to step 363 to detect when tone sequence 2 is complete.

If tone sequence 2 has not been detected as being complete at step 363, the repeater proceeds to step 364 where it determines whether at least one tone has been detected. If at least one tone has not been detected, the repeater returns to step 363 and waits for completion of tone sequence 2. If at least one tone has been detected at step 364, the repeater proceeds to step 366 and starts (or continues to process) the handshake signalling necessary to bring the called party onto the communication channel.

After the repeater starts the handshake signalling at step 366, it returns to step 363 and awaits completion of tone sequence 2. Once tone sequence 2 has been completed, the repeater proceeds to step 368 where the handshake signalling is completed. After the handshake signalling is completed, or after tone sequence 2 is completed after a non-valid tone sequence 1 (from step 362), the repeater will enable the repeat audio and the telephone audio (if a telephone was interconnected on the communication channel).

While the invention has been described in connection with what is presently considered to be the most practical and preferred embodiments, it is understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. In an improved trunking radio transceiver of the type which (a) in an idle mode scans plural channels to detect a pre-assigned calling sequence of N received signals, (b) in a wait mode scans said plural channels to detect and acquire a non-used one of said channels and (c) in a ready mode stays tuned to such detected calling or acquired channel C so as to permit transceiver communications thereon, said improvement comprising:
    transmitter means operable after initial acquisition of said channel C for (1) sending over said channel C a predetermined dispatch overdial signal to initiate an attempt to add yet another transceiver to an existing communication, (2) thereafter sending over said channel C a sequence of N identifying signals which were used to establish said transmitter means on channel C, and (3) thereafter sending over said channel C another sequence of signals identifying said another transceiver.

2. A trunking radio communications system comprising a plurality of said improved radio transceivers as in claim 1 and a plurality of radio repeaters, each radio repeater including:
    transceiving means for repeating voice communications on a said communications channel C;
    control signal monitoring means for (B 1) detecting the receipt of said predetermined dispatch overdial signal over said channel during ongoing repeating operations, (2) thereafter detecting receipt over said channel of said first sequence of N signals, and (3) subsequently detecting receipt over said channel of said another sequence of signals;
    signal regeneration means for regenerating and transmitting over said channel a regenerated version of said second sequence of signals identifying a called transceiver; and
    muting means for muting said voice repeating operations during the time said first and second sequence of signals are occurring on said channel.

3. A radio repeater for duplex repeating operations with plural transceivers, said repeater comprising:
    transceiving means for repeating voice communications on a predetermined communications channel once successfully acquired for that purpose by one or more transceivers;
    control signal monitoring means for (1) detecting the receipt of a predetermined dispatch overdial signal over said channel during ongoing repeating operations, (2) thereafter detecting receipt over said channel of a first sequence of N signals, said first sequence being signals which were used to establish said transceiving means on said channel, and (3) subsequently detecting receipt over said channel of a second sequence of signals identifying a called transceiver;
    signal regeneration means for regenerating and transmitting over said channel a regenerated version of said second sequence of signals identifying a called transceiver; and
    muting means for muting said voice repeating operations during the time said first and second sequence of signals are occurring on said channel.

4. A method for achieving inter-group communications in a trunking radio communications system including a first radio transceiver associated with a first group of such radio transceivers and a second radio transceiver associated with a second group of such radio transceivers, wherein radio transceivers associated with the same group can communicate freely with one another via a repeater over a communication channel but radio transceivers associated with different groups are nominally inhibited from communicating with one another via said repeater, said method including the steps of:
    transmitting from said first radio transceiver to said repeater, signals identifying said second radio transceiver;
    testing whether said transmitted identifying signals are valid in accordance with predetermined criteria; and
    dedicating a communication channel to said first and second radio transceivers if said testing step reveals said identifying signals are valid, wherein said transmitting step includes:
    transmitting a dispatch overdial signal,
    transmitting a first signal sequence identifying said first transceiver, and
    transmitting a second signal sequence identifying said second radio transceiver.

5. A method according to claim 4 wherein said testing step includes comparing said identifying signals with predetermined criteria defining whether dispatch overdial privileges are available to said first transceiver.

6. A method of bringing at least one additional radio transceiver onto a communication channel already acquired and operating between at least first and second radio transceivers in a trunked radio communications system including a plurality of radio transceivers which communicate with each other via at least one repeater over an acquired one of a plurality of communication channels, and wherein each transceiver has an identifying sequential tone signal which enables it to acquire the use of one of said communication channels, said method comprising the steps of:

- transmitting, by said first transceiver which desires to bring said additional transceiver into said communication channel, a dispatch overdial signal to said repeater;
- transmitting, by said first transceiver, a first tone sequence signal to said repeater which said first tone sequence signal was used to establish said first transceiver on said communication channel;
- determining, by said repeater, whether said first tone sequence signal is an identification tone signal which was validly used to first establish said communication channel;
- transmitting, by said first transceiver, a second tone sequence signal to said repeater, said second tone sequence signal being the identification tone signal of said additional transceiver;
- transmitting, by said repeater, handshake signals to establish said additional transceiver on said already acquired channel, if said first tone sequence signal is the identification tone signal which was used to first establish acquisition of the communication channel; and
- suppressing, by said repeater, said handshake signals, if said first tone sequence signal is not the identification tone signal which was used to first establish said communication channel.

7. A method according to claim 6 further including the steps of:

- muting, by said repeater, existing voice communications on said channel when said repeater detects said dispatch overdial signal;
- ceasing muting, by said repeater, of said voice communications following said handshake signals; and
- ceasing muting, by said repeater, of said voice communications following transmission of said second tone sequence signal if said handshake signals have been suppressed.

8. A method of bringing at least one additional radio transceiver onto a communication channel already acquired and operating between at least first and second radio transceivers in a trunked radio communications system including a plurality of radio transceivers which communicate with each other via at least one repeater over an acquired one of a plurality of communication channels, and wherein each transceiver has an identifying sequential tone signal which enables it to acquire the use of one of said communication channels, said method comprising the steps of:

- transmitting, by said first transceiver which desires to bring said additional transceiver into said communication channel, a dispatch overdial signal to said repeater;
- transmitting, by said first transceiver, a first tone sequence signal to said repeater which said first tone sequence signal was used to establish said first transceiver on said communication channel;
- determining, by said repeater, whether said first tone sequence signal is an identification tone signal which was validly used to first establish said communication channel;
- transmitting, by said first transceiver, a second tone sequence signal to said repeater, said second tone sequence signal being the identification tone signal of said additional transceiver;
- transmitting, by said repeater, handshake signals to establish said additional transceiver on said already acquired channel; and
- memorizing, by said repeater, said first tone sequence signal, whereby said first transceiver may be held responsible for bringing said additional radio transceiver onto said communication channel.

9. Apparatus for bringing at least one additional radio transceiver onto a communication channel already acquired and operating between at least first and second radio transceivers in a trunked radio communications system including a plurality of radio transceivers which communicate with each other via at least one repeater over an acquired one of a plurality of communication channels, and wherein each transceiver has an identifying sequential tone signal which enables it to acquire the use of one of said communication channels, comprising:

means for
  (a) transmitting a dispatch overdial signal to said repeater,
  (b) transmitting a first tone sequence signal to said repeater which said first tone sequence signal was used to establish said first transceiver on said communication channel,
  (c) transmitting a second tone sequence signal to said repeater, said second tone sequence signal being the identification tone signal of said additional transceiver, and
  (d) determining whether said first tone sequence signal is an identification tone signal which was validly used to first establish said communication channel; and means for
  (e) transmitting handshake signals to establish said additional transceiver on said already acquired channel, if said first tone sequence signal is the identification tone signal which was used to first establish acquisition of the communication channel, and
  (f) suppressing, by said repeater, said handshake signals, if said first tone sequence signal is not the identification tone signal which was used to first establish said communication channel.

10. Apparatus according to claim 9 wherein said means for transmitting and suppressing includes means for (g) muting existing voice communications on said channel when said dispatch overdial signal is detected,
  (h) ceasing muting of said voice communications following said handshake signals, and
  (i) ceasing muting of said voice communications following transmission of said second tone sequence signal if said handshake signals have been suppressed.

11. Apparatus for bringing at least one additional radio transceiver onto a communication channel already acquired and operating between at least first and second radio transceivers in a trunked radio communications system including a plurality of radio transceivers which communicate with each other via at least one repeater over an acquired one of a plurality of communication channels, and wherein each transceiver has an identifying sequential tone signal which enables it to acquire the use of one of said communication channels, comprising:

means for
(a) transmitting a dispatch overdial signal to said repeater,
(b) transmitting a first tone sequence signal to said repeater which said first tone sequence signal was used to establish said first transceiver on said communication channel,
(c) transmitting a second tone sequence signal to said repeater, said second tone sequence signal being the identification tone signal of said additional transceiver, and
(d) determining whether said first tone sequence signal is an identification tone signal which was validly used to first establish said communication channel; and means for
(e') transmitting handshake signals to establish said additional transceiver on said already acquired channel, and
(f') memorizing said first tone sequence signal so that the transceiver which transmitted said first tone sequence signal may be held accountable for bringing said additional radio transceiver onto said communication channel.

12. A method for establishing communications between radio stations via a repeater, comprising the steps of:
(1) transmitting, with a first radio station, a first signal identifying at least a second radio station;
(2) receiving and retransmitting the first signal transmitted by said transmitting step (1) with a repeater;
(3) receiving, with said second radio transceiver, said first signal retransmitted by said retransmitting step (2);
(4) retransmitting, by either one of said first and second radio transceivers, a version of the first signal transmitted by said transmitting step (1);
(5) receiving, with said repeater, the signal retransmitted by said retransmitting step (4);
(6) determining, with said repeater, whether the signal received by said receiving step (5) corresponds to the signal received by said receiving step (2);
(7) transmitting, with said one of said first and second radio transceivers, a second signal different from said first signal identifying a third radio transceiver;
(8) receiving the signal transmitted by said transmitting step (7) with said repeater; and
(9) conditionally retransmitting, with said repeater, a version of the signal received by said receiving step (8) depending upon the determination of said determining step (6).

13. A method as in claim 12 wherein said retransmitting step (9) retransmits said signal received by said receiving step (8) only if said determining step (6) determines that said signal received by said receiving step (5) has the same characteristics as the signal received by said receiving step (2).

14. A method as in claim 12 wherein:
said transmitting step (1) includes the step of transmitting a first sequence of signalling tones selected from a plurality of predetermined sequences;
said receiving and retransmitting step (2) includes the step of identifying which of said plurality of predetermined sequences said sequence transmitted by said transmitting step (1) comprises; and said determining step (6) includes the steps of:
(a) identifying which of said plurality of said predetermined sequences said signal retransmitted by said retransmitting step (4) comprises, and
(b) comparing the sequence identified by said identifying step (a) with the sequence identified by said receiving and retransmitting step (2).

15. A method as in claim 12 further including the steps of:
(a) receiving, with said one of said first and second radio transceivers, the signal retransmitted by said retransmitting step (9); and
(b) determining, with said one radio station, whether the signal received by said receiving step (a) has the same characteristics as the signal transmitted by said transmitting step (7).

16. A method as in claim 12 wherein:
said retransmitting step (4) includes the steps of:
(a) transmitting a dispatch overdial begin signal of predetermined characteristics with said one of said first and second radio transceivers,
(b) subsequent to said transmitting step (a), waiting with said one radio transceiver for a predetermined period of time,
(c) subsequent to said waiting step (b), transmitting a version of said first signal transmitted by said transmitting step (1) with said one of said first and second radio transceivers; and
said method further includes the steps of:
(d) detecting, with said repeater, whether said dispatch overdial begin signal has been transmitted by said transmitting step (a), and
(e) conditioning the performance of steps (6)–(9) on the results of said detecting step (d).

17. A method as in claim 12 wherein:
said method further includes the steps of:
(a) storing, in said first transceiver, a representation of said first identifying signal transmitted by said transmitting step (1), and
(b) storing, in said second transceiver, a representation of said first signal received by said receiving step (3); and
said transmitting step (7) includes the step of transmitting a signal having characteristics determined by the representation stored by one of said storing step (a) and (b).

18. A method for establishing radio communications via a repeater, comprising the steps of:
(1) receiving and retransmitting, with a repeater, a first signal transmitted by a first radio transceiver;
(2) receiving, with said repeater, a version of the first signal received and retransmitted by said step (1);
(3) determining, with said repeater, whether the signal received by said receiving step (2) corresponds to the signal received by said receiving and retransmitting step (1);
(4) receiving a subsequent signal transmitted by said first radio transceiver with said repeater; and
(5) conditionally retransmitting, with said repeater, a version of the signal received by said receiving step (4) depending upon the determination of said determining step (3).

19. A method as in claim 18 wherein said retransmitting step (5) transmits said signal received by said receiving step (4) only if said determining step (3) determines that said signal received by said receiving step (2) has the same characteristics as the signal received by said receiving and retransmitting step (1).

20. A method as in claim 18 wherein:
said receiving and retransmitting step (1) includes the step of representing the received signal as one of a predetermined plurality of signals; and
said determining step (3) includes the steps of:
(a) representing the signal received by said receiving step (2) as one of a predetermined plurality of signals, and
(b) comparing the representation produced by said representing step (a) with the representation produced by said receiving and transmitting step (1).

21. A method as in claim 18 wherein said method further includes:
(a) determining, with said repeater, whether said signal received by said receiving step (2) includes a dispatch overdial begin signal of predetermined characteristics; and
(b) conditioning the performance of steps (3)–(5) on the results of said determining step (a).

22. A method for establishing communications between at least first and second radio transceivers comprising the steps of:
(1) transmitting, with a first radio transceiver, a first radio signal identifying a second radio transceiver;
(2) receiving, with said second radio transceiver, said first identifying signal transmitted by said transmitting step (1);
(3) transmitting a dispatch overdial radio signal with either one of said first and second radio transceivers, said dispatch overdial signal including a version of the first signal transmitted by said transmitting step (1), and a second identifying signal different from said first signal identifying a further radio transceiver;
(4) receiving said transmitted dispatch overdial signal with said further radio transceiver; and
(5) communicating radio signals between said further radio transceiver and said first and/or second radio transceivers in response to receipt by said further radio transceiver of said dispatch overdial signal.

23. A method as in claim 22 wherein said transmitting step (1) includes the step of transmitting a signal having characteristics associated with said first and second radio transceivers but not with said further radio transceiver.

24. A method as in claim 22 wherein said transmitting step (3) further includes the steps of:
(a) transmitting a predetermined dispatch overdial begin signal having predetermined characteristics with said one of said first and second radio transceivers;
(b) subsequent to said transmitting step (a), waiting with said one radio transceiver for a predetermined period of time; and
(c) transmitting said version of first signal transmitted by said transmitting step (1) after said period of time has elapsed.

25. A method as in claim 22 further including the steps of:
(a) storing, in said first transceiver, a representation of the first identifying signal transmitted by said transmitting step (1); and
(b) storing, in said second transceiver, a representation of said first signal received by said receiving step (2).

26. A method as in claim 28 further including the step of testing if said version of said first signal retransmitted by said step (3) has characteristics which are substantially similar to said first signal transmitted by said step (1), performance of said communicating step (5) being conditioned on the results of said test.

27. A method for establishing communications between at least first and second radio transceivers comprising the steps of:
(1) transmitting, with a first radio transceiver, a first signal identifying at least a second radio transceiver;
(2) receiving, with said second radio transceiver, said first signal transmitted by said transmitting step (1);
(3) retransmitting, with either one of said first and second radio transceivers, a version of the first signal transmitted by said transmitting step (1);
(4) retransmitting, with said one of said first and second radio transceivers, a second signal different from said first signal identifying a third radio transceiver;
(a) listening, subsequent to said transmitting step (4), for a version of said signal transmitted by said transmitting step (4); and
(b) determining, with said one radio station, whether a signal heard by said receiving step (a) has the same characteristics as the signal transmitted by said transmitting step (4).

28. A method for selectively establishing communications between a first radio station and a plurality of other radio stations comprising the steps of:
(1) transmitting, with a first radio station, a first signal identifying at least a second radio transceiver;
(2) transmitting a dispatch overdial connect signal of predetermined characteristics by said first radio station; p1 (3) subsequent to said transmitting step (2), waiting with said first radio station for a predetermined period of time; p1 (4) subsequent to said waiting step (3), retransmitting a version of the first signal transmitted by said transmitting step (1);
(5) transmitting, with said first radio station, a further signal different from said previously-transmitted signals, identifying a further radio transceiver; and
(6) repeating said steps (2)–(5) for each futher radio station with which communications is to be established.

29. In an improved trunking radio transceiver of the type which (a) scans plural channels to detect a calling sequence of N signals, (b) scans said plural channels to detect and acquire a non-used one of said channels, and (c) stays tuned to such detected calling or acquired channel C so as to permit transceiver communications thereon, said improvement comprising:
transmitter means operable after initial acquisition of said channel C for (1) sending over said channel C a dispatch overdial signal to initiate an attempt to add yet another transceiver to an existing communication, (2) thereafter sending over said channel C a sequence of N identifying signals which were used to establish said transmitter means on said channel C, and (3) thereafter sending over said channel C another sequence of signals identifying said another transceiver.

30. In a trunked radio communications system including a plurality of radio transceivers which communicate with one another via a repeater over an acquired one of a plurality of radio communication channels, said acquired channel being earlier acquired by first and second radio transceivers in response to an initial identifying radio signal transmitted by one of said first and second transceivers, each transceiver having an identifying radio signal associated therewith, a method of calling an additional radio transceiver onto said acquired channel comprising the steps of:
- transmitting, with said first transceiver, a dispatch overdial radio signal to said repeater;
- transmitting, with said first transceiver, a first identifying radio signal to said repeater, said first identifying signal being identical to the initial identifying signal;
- comparing, with said repeater, said first identifying signal with the initial identifying signal;
- transmitting, with said first transceiver, a second identifying radio signal to said repeater identifying said additional transceiver;
- transmitting, with said repeater, handshake signals calling said additional transceiver onto said earlier acquired channel if said comparison reveals said first and initial identifying signals match; and
- inhibiting said handshake signals transmitting step if said comparison reveals said first identifying signal does not match said initial identifying signal.

31. A method according to claim 30 further including the steps of:
- muting communications on said channel upon receipt said dispatch overdial signal;
- ceasing muting said communications beginning after transmission of said handshake signals if said handshake signal transmitting step is not inhibited; and
- ceasing muting said voice communications beginning after transmission of said second identifying signal if transmission of said handshake signals has been inhibited.

32. In a trunked radio communications system including first and second radio transceivers which communicate radio signals to one another via a radio signal repeater means over an acquired one of a plurality of communication channels, said first and second radio transceivers each having an identifying signal associated therewith, apparatus for bringing an additional radio transceiver onto said acquired communication channel comprising:
- radio repeater means operating on a communications channel for receiving a first identifying radio signal, for storing characteristics of said received first signal and for enabling communications between said first and second radio transceivers over said communications channel in response to receipt of said first identifying signal;
- transmitting means in at least one of first and second transceivers for:
  - transmitting a dispatch overdial radio signal,
  - repeating transmission of said first identifying signal, and
  - transmitting a second identifying radio signal associated with said additional transceiver;
- said radio repeater means also for testing whether characteristics of said first signal match the stored characteristics, and for retransmitting said second identifying signal to establish said additional transceiver on said already acquired channel only if said testing reveals said first identifying signal characteristics match said stored signal characteristics.

33. Apparatus according to claim 32 further including muting means, coupled to said repeater means, for:
- muting communications on said channel upon receipt of said dispatch overdial signal,
- ceasing muting said communications beginning after retransmission of said second identifying signal if said testing reveals a match, and
- ceasing muting said communications beginning after transmission of said second identifying signal if said testing means reveals said first identifying signal characteristics do not match said stored signal characteristics.

34. A method for establishing radio communications via a radio repeater, comprising the steps of:
(1) transmitting radio signals with a first radio transceiver;
(2) receiving and retransmitting, with a repeater, a first radio signal transmitted by said first radio transceiver;
(3) subsequent to said receiving and retransmitting step (2), receiving, with said repeater, a version of the first signal transmitted by said first radio transceiver;
(4) determining, with said repeater, whether the signal received by said receiving step (3) corresponds to the signal received earlier by said receiving and retransmitting step (2);
(5) receiving, with said repeater, a further radio signal transmitted by said first radio transceiver; and
(6) conditionally retransmitting, with said repeater, a version of the signal received by said receiving step (5) depending upon the determination of said determining step (4).

35. A method for selectively establishing communications between a first radio transceiver and a plurality of other radio transceivers comprising the steps of:
(1) transmitting, with a first radio transceiver, a first radio signal identifying at least a second radio transceiver;
(2) transmitting a dispatch overdial connect radio signal having predetermined characteristics with said first radio transceiver;
(3) subsequent to said transmitting step (2), waiting a predetermined period of time;
(4) subsequent to said waiting step (3), retransmitting a version of the first signal transmitted by said transmitting step (1);
(5) transmitting, with said first radio transceiver, a further radio signal different from said signals transmitted by steps (1), (2) and (4), said further signal identifying a further radio transceiver; and
(6) repeating said steps (2)–(5) for each further radio transceiver with which communications is to be established.

* * * * *